United States Patent
Maniktala

(10) Patent No.: US 11,239,027 B2
(45) Date of Patent: Feb. 1, 2022

(54) BENT COIL STRUCTURE FOR WIRELESS POWER TRANSFER

(71) Applicant: ChargEdge, Inc., Fremont, CA (US)

(72) Inventor: Sanjaya Maniktala, Fremont, CA (US)

(73) Assignee: CHARGEDGE, INC., Fremont, CA (US)

(*) Notice: Subject to any disclaimer, the term of this patent is extended or adjusted under 35 U.S.C. 154(b) by 152 days.

(21) Appl. No.: 15/708,426

(22) Filed: Sep. 19, 2017

(65) Prior Publication Data

US 2018/0005755 A1 Jan. 4, 2018

Related U.S. Application Data

(63) Continuation-in-part of application No. 15/082,533, filed on Mar. 28, 2016, now Pat. No. 10,374,459.
(Continued)

(51) Int. Cl.
*H02J 7/00* (2006.01)
*H01F 38/14* (2006.01)
(Continued)

(52) U.S. Cl.
CPC ......... *H01F 38/14* (2013.01); *H01F 27/2804* (2013.01); *H02J 7/025* (2013.01); *H02J 50/12* (2016.02); *H02J 50/40* (2016.02)

(58) Field of Classification Search
CPC ....................................................... H01F 38/14
(Continued)

(56) References Cited

U.S. PATENT DOCUMENTS 6,212,430 B1  4/2001 Kung
6,479,997 B1  11/2002 Westphal et al.
(Continued)

FOREIGN PATENT DOCUMENTS

WO  WO-2009027674 A1  3/2009
WO  WO-2010090539 A1  8/2010
(Continued)

OTHER PUBLICATIONS

Wireless Power Consortium, "Qi System Description Wireless Power Transfer," vol. I: Low Power, Part 1: Interface Definition, Version 1.1.2, Jun. 2013.
(Continued)

*Primary Examiner* — Yalkew Fantu
(74) *Attorney, Agent, or Firm* — White & Case LLP

(57) ABSTRACT

In one embodiment, an apparatus comprises a coil structure comprising a first coil and a second coil, each of the first coil and the second coil having a first side portion, a center portion, and a second side portion, wherein the first side portion forms a first angle with the center portion and the second side portion forms a second angle with the center portion, and a layer of magnetic material adjacent to the center portion of the first coil and the center portion of the second coil, the first coil and the second coil being configured such that when a current flows in a first spatial direction in the first coil a current flows in a second spatial direction different from the first spatial direction in the second coil. In one embodiment, the apparatus further comprises a power circuit configured to provide a time-varying current to the coil structure and a battery configured to provide a direct current to the power circuit.

22 Claims, 5 Drawing Sheets

Related U.S. Application Data

(60) Provisional application No. 62/396,231, filed on Sep. 19, 2016.

(51) Int. Cl.
*H02J 7/02* (2016.01)
*H02J 50/12* (2016.01)
*H01F 27/28* (2006.01)
*H02J 50/40* (2016.01)

(58) Field of Classification Search
USPC .......................................................... 320/108
See application file for complete search history.

(56) References Cited

U.S. PATENT DOCUMENTS

| | | | |
|---|---|---|---|
| 6,657,326 | B1 | 12/2003 | Yamamoto et al. |
| 7,221,251 | B2 | 5/2007 | Menegoli et al. |
| 7,948,781 | B2 * | 5/2011 | Esaka ................... H01F 38/14 363/67 |
| 8,604,443 | B2 | 12/2013 | Sinclair et al. |
| 9,276,437 | B2 | 3/2016 | Partovi et al. |
| 2003/0052680 | A1 | 3/2003 | Konijn |
| 2005/0073466 | A1 | 4/2005 | Karlsen |
| 2006/0061324 | A1 | 3/2006 | Oglesbee |
| 2009/0096413 | A1 * | 4/2009 | Partovi ................... H01F 38/14 320/108 |
| 2010/0181841 | A1 | 7/2010 | Azancot et al. |
| 2010/0259217 | A1 | 10/2010 | Baarman et al. |
| 2011/0057606 | A1 * | 3/2011 | Saunamaki ............. H02J 7/025 320/108 |
| 2011/0115429 | A1 | 5/2011 | Toivola et al. |
| 2011/0217927 | A1 | 9/2011 | Ben-Shalom et al. |
| 2011/0304216 | A1 | 12/2011 | Baarman |
| 2012/0154086 | A1 | 6/2012 | Willemsen et al. |
| 2013/0043734 | A1 | 2/2013 | Stone et al. |
| 2013/0093252 | A1 | 4/2013 | Norconk et al. |
| 2013/0093386 | A1 | 4/2013 | Tsai et al. |
| 2013/0175877 | A1 | 7/2013 | Abe et al. |
| 2013/0214591 | A1 | 8/2013 | Miller et al. |
| 2013/0249479 | A1 | 9/2013 | Partovi |
| 2013/0307468 | A1 * | 11/2013 | Lee ....................... H02J 7/0052 320/108 |
| 2014/0070622 | A1 | 3/2014 | Keeling et al. |
| 2014/0125140 | A1 | 5/2014 | Widmer et al. |
| 2014/0167688 | A1 | 6/2014 | Doyle et al. |
| 2014/0232330 | A1 | 8/2014 | Robertson et al. |
| 2014/0266031 | A1 | 9/2014 | Sasaki |
| 2014/0312834 | A1 * | 10/2014 | Tanabe ................... H02J 7/025 320/108 |
| 2014/0340187 | A1 | 11/2014 | Werner et al. |
| 2015/0091388 | A1 | 4/2015 | Golko et al. |
| 2015/0123486 | A1 | 5/2015 | Abe et al. |
| 2015/0145343 | A1 | 5/2015 | Chiyo et al. |
| 2015/0295416 | A1 | 10/2015 | Li |
| 2015/0372493 | A1 | 12/2015 | Sankar |
| 2016/0001663 | A1 | 1/2016 | Chae et al. |
| 2016/0111887 | A1 | 4/2016 | Jeong |
| 2016/0121732 | A1 | 5/2016 | Matsumoto et al. |
| 2016/0241084 | A1 | 8/2016 | Guo et al. |
| 2020/0047632 | A1 | 2/2020 | Rumbak |

FOREIGN PATENT DOCUMENTS

| | | |
|---|---|---|
| WO | WO-2013074332 A1 | 5/2013 |
| WO | WO2013122483 A1 | 8/2013 |
| WO | WO2013154440 A1 | 10/2013 |

OTHER PUBLICATIONS

Maniktala, S., "Fixing EMI across the Board," EE Times, Nov. 5, 2003, http://www.eetimes.com/document.asp?doc_id=1230444.

Maniktala, S., "More on Designing Reliable Electronic Ballasts," EE Times, Apr. 20, 2005, http://www.eetimes.com/document.asp?doc_id=1272231.

Maniktala, S. "The Confluence of Resonant Switching Topologies and Wireless Charging," presented at ISSCC 2015, San Francisco, CA, Feb. 26, 2015.

Maniktala, S., "WPT Breaks All Connections, Part 1," EDN Network, Mar. 9, 2015, http://www.edn.com/design/power-management/4438850/WPT-breaks-all-connections—Part-1.

Maniktala, S., "WPT Breaks All Connections, Part 2," EDN Network, Mar. 14, 2015, http://www.edn.com/design/power-management/4438924/WPT-breaks-all-connections—Part-2.

Maniktala, S., "Wpt Breaks All Connections, Part 3," EDN Network, Apr. 6, 2015, http://www.edn.com/design/power-management/4439125/WPT-breaks-all-connections—Part-3.

Power Matters Alliance, "PMA Inductive Wireless Power and Charging Transmitter Specification—System Release 1," PMA-TS-0003-0 v2.00, Apr. 24, 2014.

Power Matters Alliance, "PMA Inductive Wireless Power and Charging Receiver Specification—System Release 1," PMA-TS-0001-0 v1.00, Nov. 16, 2013.

"Notification of Transmittal of the International Search Report and the Written Opinion of the International Searching Authority," Int'l Appl. No. PCT/US2016/066105, dated Feb. 7, 2017.

"Notification of Transmittal of the International Search Report and the Written Opinion of the International Searching Authority," Int'l Appl. No. PCT/US2017/020465, dated May 11, 2017.

"Notification of Transmittal of the International Search Report and the Written Opinion of the International Searching Authority," Int'l Appl. No. PCT/US2016/024483, dated Jun. 20, 2016.

"Notification of Transmittal of the International Search Report and the Written Opinion of the International Searching Authority," Int'l Appl. No. PCT/US17/49756, dated Nov. 9, 2017.

Budhia, et al., "Development of a Single-Sided Flux Magnetic Coupler for Electric Vehile IPT Charging Systems," IEEE Transactions on Industrial Electronics., vol. 60, No. 1., pp. 318-328, Jan. 1, 2013.

Extended European Search Report—EP16773913.5 dated Nov. 15, 2018 (11 pages).

Maniktala, S., "More on Designing Reliable Electronic Ballasts," EE Times, Apr. 20, 2005, http://www.eetimes.com/document.aps?doc_id= 1272231.

* cited by examiner

BENT COIL STRUCTURE FOR WIRELESS POWER TRANSFER

CROSS-REFERENCE TO RELATED APPLICATIONS

This application claims the benefit of U.S. Provisional Patent Application No. 62/396,231, entitled "Bent Coil Structures in Wireless Power Transfer," filed on Sep. 19, 2016, subject matter of which is hereby incorporated by reference in its entirety. This application is also a continuation-in-part of U.S. patent application Ser. No. 5/082,533, entitled "Wireless Power Transfer Using Multiple Coil Arrays," filed on Mar. 28, 2016, the subject matter of which is hereby incorporated by reference in its entirety.

FIELD OF THE INVENTION

This invention relates generally to wireless power transfer and more specifically to a bent coil structure for wireless power transfer.

BACKGROUND

Electronic devices typically require a connected (wired) power source to operate, for example, battery power or a wired connection to a direct current ("DC") or alternating current ("AC") power source. Similarly, rechargeable battery-powered electronic devices are typically charged using a wired power-supply that connects the electronic device to a DC or AC power source. A limitation of these devices is the need to directly connect the device to a power source using wires.

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Wireless power transmitters commonly include a flat spiral transmitter coil under a flat transmitting surface. Such flat transmitting surfaces may be convenient for handheld devices such as smartphones, but for larger devices such as tablets and laptops a wireless power transmitter with an appropriately-sized flat transmitting surface may occupy a large amount of area on a desk or tabletop. It may be inconvenient for users to have a large area of a desktop or other surface occupied by a wireless power transmitter or to travel with such a wireless power transmitter. Thus, there is a need for a technique for more convenient wireless power transfer to electronic devices including tablets and laptops.

SUMMARY OF THE INVENTION

In one embodiment, an apparatus comprises a coil structure comprising a first coil and a second coil, each of the first coil and the second coil having a first side portion, a center portion, and a second side portion, wherein the first side portion forms a first angle with the center portion and the second side portion forms a second angle with the center portion, and a layer of magnetic material adjacent to the center portion of the first coil and the center portion of the second coil, the first coil and the second coil being configured such that when a current flows in a first spatial direction in the first coil a current flows in a second spatial direction different from the first spatial direction in the second coil. In one embodiment, the apparatus further comprises a power circuit configured to provide a time-varying current to the coil structure and a battery configured to provide a direct current to the power circuit. In one embodiment, the apparatus further comprises a receive circuit configured to receive a time-varying current from the coil structure, the time-varying current induced in the coil structure by a magnetic field. In one embodiment, each of the first angle and the second angle has a value from approximately 90 degrees to approximately 175 degrees.

In one embodiment, an apparatus comprises a first coil having a first side portion, a center portion, and a second side portion, wherein the first side portion of the first coil forms a first angle with the center portion of the first coil and the second side portion of the first coil forms a second angle with the center portion of the first coil, a second coil having a first side portion, a center portion, and a second side portion, wherein the first side portion of the second coil forms a third angle with the center portion of the second coil and the second side portion of the second coil forms a fourth angle with the center portion of the second coil, and a layer of magnetic material adjacent to the center portion of the first coil and the center portion of the second coil, the first coil and the second coil being configured such that when a current flows in a first spatial direction in the first coil a current flows in a second spatial direction different from the first spatial direction in the second coil. In one embodiment, the apparatus further comprises a power circuit configured to provide a time-varying current to the coil structure and a battery configured to provide a direct current to the power circuit. In one embodiment, the apparatus further comprises a receive circuit configured to receive a time-varying current from the coil structure, the time-varying current induced in the coil structure by a magnetic field. In one embodiment, each of the first angle, the second angle, the third angle, and the fourth angle has a value from approximately 90 degrees to approximately 175 degrees.

DETAILED DESCRIPTION

Figure 1:
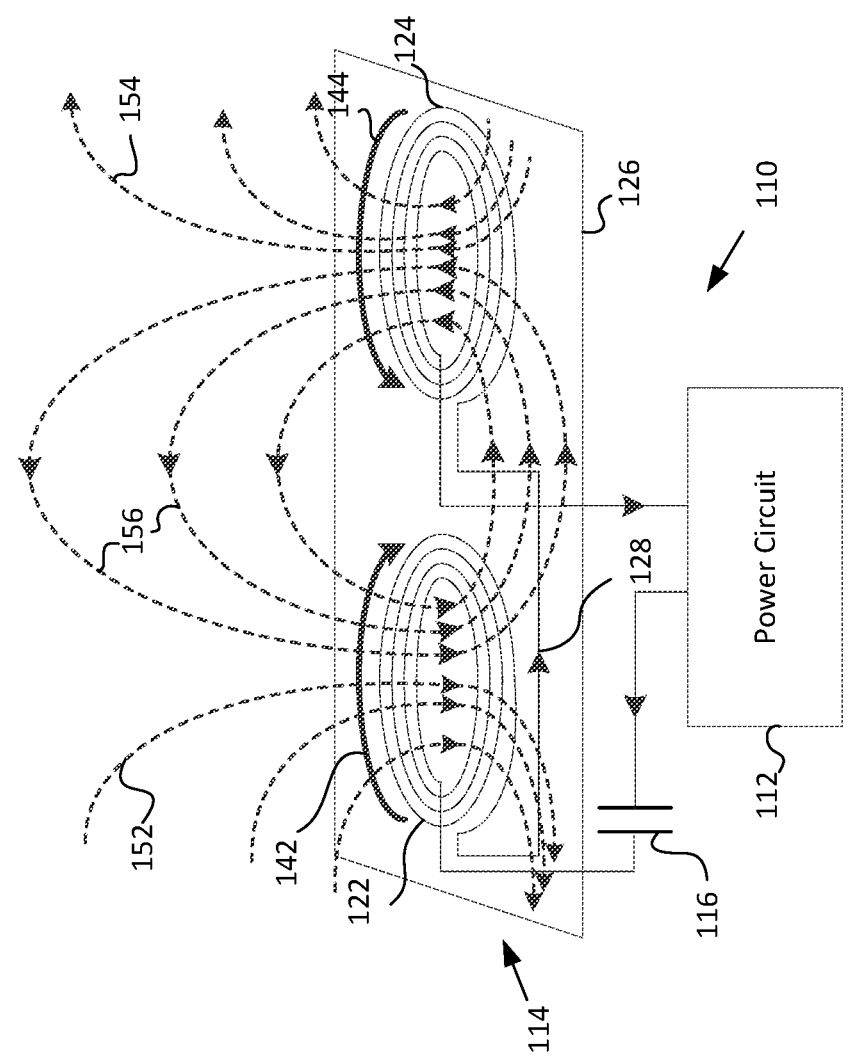
FIG. 1 is a diagram of one embodiment of a wireless power transmitter with an opposite polarity coil structure, according to the invention.

FIG. 1 is a diagram of one embodiment of a wireless power transmitter 100 with an opposite polarity coil structure, according to the invention. Transmitter 110 includes, but is not limited to, a power circuit 112, a coil structure 114, and a capacitor 116. Coil structure 114 includes, but is not limited to, a coil 122 and a coil 124 that are magnetically coupled together by a magnetic layer 126. Magnetic layer 126 underlies both coil 122 and coil 124. Magnetic layer 126 can be made of ferrite or any other magnetic material known in the art. Coil 122 and coil 124 are preferably identical coils with the same number of turns and the same area. Power circuit 112 generates an AC signal that is provided to capacitor 116 and coil structure 114. The generated AC signal can be, but is not limited to, a square wave, a sinusoidal wave, a triangular wave, or a sawtooth wave. The resonant frequency of transmitter 110 is determined by the capacitance of capacitor 116 and the total inductance of coil 122 and coil 124. Coils 122 and 124 can be formed of wire or traces on a printed circuit board using conductive material such as copper, gold, or any other conductive material known in the art. In the FIG. 1 embodiment, coils 122 and 124 are in the shape of an circular spiral; other coil shapes such as an elliptical spiral or a rectangular spiral are within the scope of the invention.

At a given point in time, a current 142 flows through coil 122 in a clockwise spatial direction. The clockwise flow of current 142 through coil 122 generates a magnetic field represented by flux lines 152. According to the "right-hand-rule," the clockwise flow of current 142 through coil 122 causes flux lines 152 to flow in the downward direction. Current 142 flows from coil 122 to coil 124 through a connection 128 (i.e., coil 122 is coupled in series with coil 124). At the same point in time, a current 144 flows through coil 124 in a counter-clockwise spatial direction. The counter-clockwise flow of current 144 through coil 124 generates a magnetic field represented by flux lines 154. According to the "right-hand-rule," the counter-clockwise flow of current 144 through coil 124 causes flux lines 154 to flow in the upward direction.

Current 142 is equivalent in magnitude to current 144 but flows in an opposite spatial direction. If coil 122 and coil 124 are identical, the flow of current 142 through coil 122 generates a magnetic field equivalent in magnitude to the magnetic field generated by the flow of current 144 through coil 124. Because current 142 and current 144 are flowing in opposite spatial directions at any given point in time, the magnetic field generated by current 142 is in a different direction than the magnetic field generated by current 144 (i.e., the magnetic fields have different polarity). Further, because flux lines 152 and flux lines 154 are flowing in opposite directions, the magnetic reluctance between flux lines 152 and flux lines 154 is low, causing flux lines 152 and flux lines 154 to attract to each other. Flux lines 152 and flux lines 154 magnetically couple to form closed flux lines 156. Magnetic layer 126 facilitates the coupling of the magnetic fields generated by coil 122 and coil 124. In another embodiment, coil 122 is coupled in parallel with coil 124 such that a current flowing in coil 122 is flowing in an opposite spatial direction to a current flowing in coil 124 to form closed flux lines between the centers of coils 122 and 124. In another embodiment, transmitter 100 includes separate power circuits, one power circuit to provide a time-varying current to coil 122 and another power circuit to provide a time-varying current to coil 124, where the two time-varying currents have substantially the same amplitude, frequency, and phase. Further embodiments of wireless power transfer systems are disclosed in U.S. patent application Ser. No. 15/082,533, the subject matter of which is incorporated by reference in its entirety as if fully set forth herein.

Figure 2:
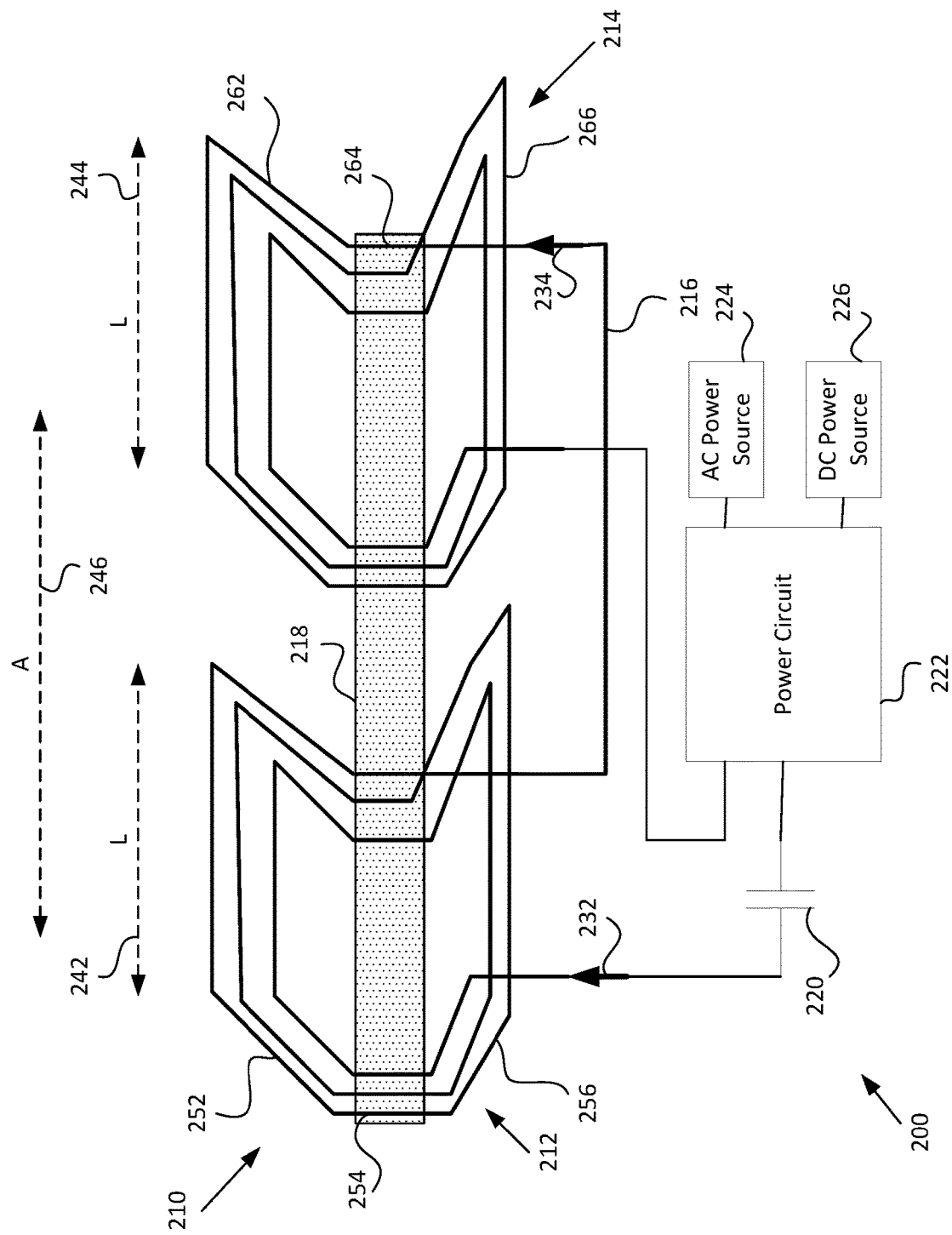
FIG. 2 is a diagram of one embodiment of a wireless power system with a bent coil structure, according to the invention.

FIG. 2 is a diagram of one embodiment of a wireless power system 200 with a bent coil structure, according to the invention. System 200 includes, but is not limited to, an opposite polarity bent coil structure 210, a capacitor 220, and a power circuit 222. Bent coil structure 210 includes a coil 212 and a coil 214, which are electrically coupled together in series by a connector 216, and a magnetic layer 218. In another embodiment, coil 212 and coil 214 are coupled together in parallel. Coil 212 has an outer dimension L 242 and coil 214 has an outer dimension L 244 that are substantially equal. Coil 212 and coil 214 are preferably identical coils with the same number of turns and the same area. Bent coil structure 210 has a center-to-center dimension A 246 that is the distance between the center of coil 212 and the center of coil 214. Center-to-center dimension A 246 can vary such that in some embodiments coils 212 and 214 are spaced apart from each other, as shown in FIG. 2, and in other embodiments coils 212 and 214 partially overlap. For effective wireless power transfer, in preferred embodiments center-to-center dimension A 246 is in the range of approximately half the outer dimension L 242 of coil 212 (L/2) to approximately two times the outer dimension L 242 of coil 212 (2 L). In the FIG. 2 embodiment, each of coil 212 and coil 214 has the shape of a rectangular spiral; other coil shapes such as a circular spiral or elliptical spiral are within the scope of the invention.

Coil 212 includes a first side portion 252, a center portion 254, and a second side portion 256. Coil 212 is angled or bent such that first side portion 252 forms a first angle with center portion 254 and second side portion 256 forms a second angle with center portion 254. Coil 214 includes a first side portion 262, a center portion 264, and a second side portion 266. Coil 214 is angled or bent such that first side portion 262 forms a first angle with center potion 264, and second side portion 266 forms a second angle with center portion 264. Magnetic layer 218 underlies center portion 254 of coil 212 and center portion 264 of coil 214. In a preferred embodiment, magnetic layer 218 has a length that is at least approximately equal to center-to-center dimension A 246 and is arranged symmetrically with regard to a geometric center of bent coil structure 210. Magnetic layer 218 is made from ferrite or any other magnetic material known in the art.

Power circuit 222 generates an AC signal that is provided to capacitor 220 and bent coil structure 210. The generated AC signal can be, but is not limited to, a square wave, a sinusoidal wave, a triangular wave, or a sawtooth wave. The resonant frequency of wireless power system 200 is determined by the capacitance of capacitor 220 and the total inductance of coil 212 and coil 214. Power circuit 222 is configured to receive power from either an AC power source 224, such as a household outlet coupled to a municipal power grid, or a DC power source 226 such as a battery. At a given point in time, a current 232 flows through coil 212 in a clockwise spatial direction. The clockwise flow of current 232 through coil 212 generates a magnetic field (not shown). According to the "right-hand-rule," the clockwise flow of current 232 through coil 212 causes flux lines of the magnetic field to flow in a first direction (into the page). At the same point in time, a current 234 flows through coil 214 in a counter-clockwise spatial direction. The counter-clockwise flow of current 234 through coil 214 generates a magnetic field (not shown). According to the "right-hand-rule," the counter-clockwise flow of current 234 through coil 214 causes flux lines of the magnetic field to flow in a second direction (out of the page). Because current 232 and current 1234 are flowing in opposite spatial directions at any given point in time, the magnetic field produced by coil 212 is in a different direction than the magnetic field produced by coil 214 (i.e., the magnetic fields have different polarity). Flux lines from the magnetic fields produced by coil 212 and coil 214 magnetically couple together in an area between the center of coil 212 and the center of coil 214. Magnetic layer 218 enhances the coupling of the magnetic fields generated by coil 212 and coil 214.

A magnetic field produced by system 200 can be used to wirelessly transfer power to a receiving system that includes a receiver coil. In another embodiment, system 200 is configured to receive as well as transmit wireless power. In such an embodiment, a magnetic field produced by a transmitter in proximity to system 200 induces a time-varying current to flow in coil 212 and coil 214 and power circuit 222 includes a receiver circuit to rectify and regulate the induced current to provide an output voltage. The output voltage may be used to charge DC power source 226.

Figure 3:
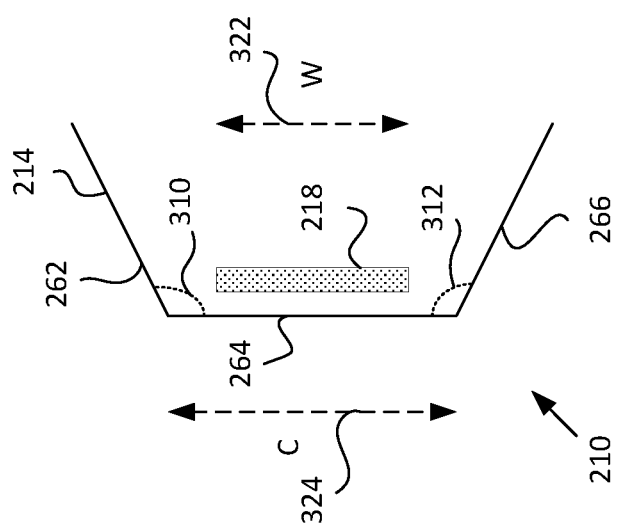
FIG. 3 is a diagram showing a side view of one embodiment of the bent coil structure for wireless power transfer of FIG. 2, according to the invention.

FIG. 3 is a diagram showing a side view of one embodiment of the bent coil structure 210 for wireless power transfer of FIG. 2, according to the invention. The side view of FIG. 3 shows coil 214 and magnetic layer 218 of bent coil structure 210. First side portion 262 forms an angle 310 with center portion 264, and second side portion 266 forms an angle 312 with center portion 264. In one embodiment, angle 310 and angle 312 are substantially equal, but in other embodiments angle 310 and angle 312 are not substantially equal. Each of angle 310 and angle 312 is in the range of approximately 90° to approximately 175°. In the FIG. 3 embodiment, a dimension W 322 of magnetic layer 218 is less than a dimension C 324 of center portion 264 coil 214; however in other embodiments dimension W 322 of magnetic layer 218 is substantially equal to dimension C 324 of center portion 264 of coil 214. In the FIG. 3 embodiment, magnetic layer 218 is not in contact with center portion 264 of coil 214; however in other embodiments magnetic layer 218 is in physical contact with center portion 264 of coil 214 and center portion 254 of coil 212. In one embodiment, dimension C 324 of center portion 264 of coil 214 is in the range of approximately 0.3 to 1.5 inches. The bent or angled shape of coils 212 and 214 allows wireless power system 200 to have a transmitting surface with a dimension that is substantially similar to dimension C 324 of center portion of coil 214.

Figure 4:
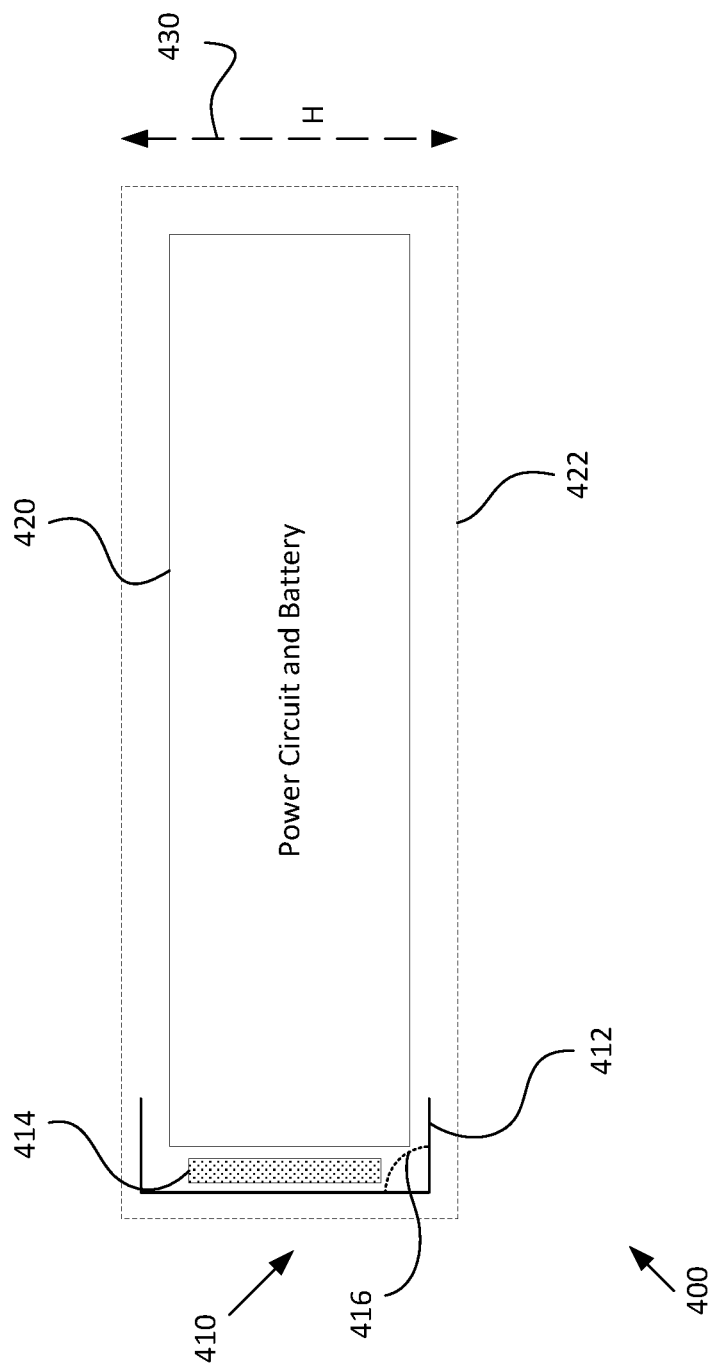
FIG. 4 is a diagram of one embodiment of a side view of a portable wireless power system with a bent coil structure, according to the invention.

FIG. 4 is a diagram of a side view of one embodiment of a portable wireless power system 400 with a bent coil structure 410, according to the invention. Portable wireless power system 400 is configured to transmit a wireless power signal to transfer power to an electronic device. Portable wireless power system 400 includes, but is not limited to, a bent coil structure 410, a power circuit and battery 420, and an outer housing 422. Bent coil structure 410 includes an opposite polarity coil pair 412 and a magnetic layer 414. Although only one coil of opposite polarity coil pair 412 is shown in the side view of FIG. 4, opposite polarity coil pair 412 includes two substantially identical coils coupled together in such a way that when a time-varying current flows in one spatial direction in a first coil the time-varying current flows in a different spatial direction in a second coil. Side portions of opposite polarity coil pair 412 form an angle 416 with a center portion of opposite polarity coil pair 412. Magnetic layer 414 is located adjacent to the center portion of opposite polarity coil pair 412. Opposite polarity coil pair 412 is electrically coupled to power circuit and battery 420 and power circuit and battery 420 is configured to provide a time-varying current to opposite polarity coil pair 412. When a time-varying current flows in opposite polarity coil pair 412, opposite polarity coil pair 412 produces a magnetic field that can provide power to a receiver coil in an electronic device. In one embodiment, portable wireless power system 400 can be coupled to an AC power source or a DC power source to receive power to charge the battery. In one embodiment, power circuit and battery 420 includes a receiver circuit configured to receive power from a time-varying current induced in bent coil structure 410 by a magnetic field. In one embodiment, portable wireless power system 400 has a height dimension H 430 that is in the range of approximately 0.5 to 2.0 inches. Outer housing 422 is made of a non-magnetic material such as plastic or glass.

Figure 5:
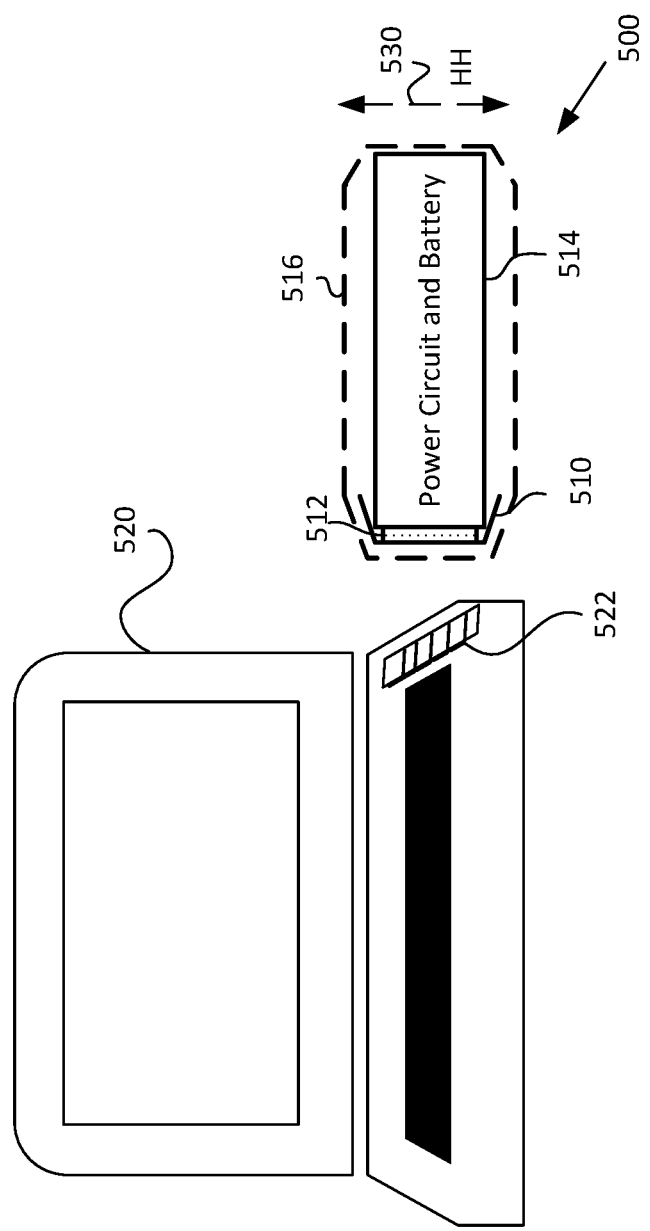
FIG. 5 is a diagram of one embodiment of a portable wireless power system with a bent coil structure providing wireless power to a portable electronic device, according to the invention.

FIG. 5 is a diagram of one embodiment of a portable wireless power system 500 with a bent coil structure providing wireless power to a portable electronic device 520, according to the invention. Portable wireless power system 500 includes, but is not limited to, an opposite polarity coil pair 510, a magnetic layer 512, a power circuit and battery 514, and an outer housing 516. Although only one coil of opposite polarity coil pair 510 is shown in FIG. 5, opposite polarity coil pair 510 includes two substantially identical coils coupled together in such a way that when a time-varying current flows in one spatial direction in a first coil the time-varying current flows in a different spatial direction in a second coil. Side portions of opposite polarity coil pair 510 form an angle with a center portion of opposite polarity coil pair 510. Magnetic layer 512 is located adjacent to the center portions of opposite polarity coil pair 510. Opposite polarity coil pair 510 is electrically coupled to power circuit and battery 514 and power circuit and battery 514 is configured to provide a time-varying current to opposite polarity coil pair 510. When a time-varying current flows in opposite polarity coil pair 510, opposite polarity coil pair 510 produces a magnetic field that can provide power to a receiver coil structure 522 in electronic device 520. In the FIG. 5 embodiment, receiver coil structure 522 is a solenoid coil structure including a helical coil wrapped around a ferrite core. One embodiment of such a receiver coil structure is disclosed in U.S. patent application Ser. No. 15/375,499, filed on Dec. 12, 2016, the subject matter of which is incorporated herein by reference in its entirety. In the FIG. 5 embodiment, electronic device 520 is a laptop computer; however any other type of electronic device such as a tablet, a smartphone, a wearable device (e.g., fitness tracker), or a drone is within the scope of the invention.

In one embodiment, portable wireless power system 500 can be coupled to an AC power source or a DC power source to receive power to charge the battery. In one embodiment, power circuit and battery 514 includes a receiver circuit configured to receive power from a time-varying current induced in opposite polarity coil pair 510 by a magnetic field. In one embodiment, portable wireless power system 500 has a height dimension HH 530 that is in the range of approximately 0.5 to 2.0 inches. Outer housing 516 is made of a non-magnetic material such as plastic or glass. As shown in FIG. 5, portable wireless power system 500 can be placed alongside electronic device 520 to provide wireless power to electronic device 520. Portable wireless power system 500 allows a user flexibility in wirelessly charging electronic device 520 by not requiring the user to place electronic device 520 on top of a transmitting surface.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An apparatus comprising:
   a coil structure comprising
   a first coil and a second coil, each of the first coil and the second coil comprising a spiral coil that has been bent to form a three dimensional structure having a first side portion, a center portion, and a second side portion, wherein the first side portion forms a first angle with the center portion and the second side portion forms a second angle with the center portion, wherein the first side portion and the second side portion in each of the first coil and the second coil, respectively, are symmetrical about the center portion of each coil, and
   a layer of magnetic material adjacent to the center portion of the first coil and the center portion of the second coil,
   the first coil and the second coil being configured such that when a current flows in a first spatial direction in the first coil a current flows in a second spatial direction different from the first spatial direction in the second coil.

2. The apparatus of claim 1, wherein the first angle has a value from approximately 90 degrees to approximately 175 degrees.

3. The apparatus of claim 1, wherein the second angle has a value from approximately 90 degrees to approximately 175 degrees.

4. The apparatus of claim 1, wherein the first angle and the second angle are substantially equal.

5. The apparatus of claim 1, further comprising a power circuit configured to provide a time-varying current to the coil structure.

6. The apparatus of claim 5, further comprising a battery configured to provide a direct current to the power circuit.

7. The apparatus of claim 1, further comprising a receive circuit configured to receive a time-varying current from the coil structure, the time-varying current induced in the coil structure by a magnetic field.

8. The apparatus of claim 7, wherein the receive circuit is configured to generate a voltage to charge a battery.

9. The apparatus of claim 1, wherein the first coil and the second coil are coupled together in series.

10. The apparatus of claim 1, wherein the center portion of the first coil and the center portion of the second coil each has a dimension in the range of approximately 0.3 to 1.5 inches.

11. The apparatus of claim 1, wherein the first side portion and the second side portion of each coil face each other.

12. An apparatus comprising:
    a coil structure comprising
    a first coil comprising a spiral coil that has been bent to form a three dimensional structure having a first side portion, a center portion, and a second side portion, wherein the first side portion of the first coil forms a first angle with the center portion of the first coil and the second side portion of the first coil forms a second angle with the center portion of the first coil,
    a second coil comprising a spiral coil that has been bent to form a three dimensional structure having a first side portion, a center portion, and a second side portion, wherein the first side portion of the second coil forms a third angle with the center portion of the second coil and the second side portion of the second coil forms a fourth angle with the center portion of the second coil, wherein the first side portion and the second side portion in each of the first coil and the second coil, respectively, are symmetrical about the center portion of each coil, and
    a layer of magnetic material adjacent to the center portion of the first coil and the center portion of the second coil,
    the first coil and the second coil being configured such that when a current flows in a first spatial direction in the first coil a current flows in a second spatial direction different from the first spatial direction in the second coil.

13. The apparatus of claim 12, wherein each of the first angle, the second angle, the third angle, and the fourth angle has a value from approximately 90 degrees to approximately 175 degrees.

14. The apparatus of claim 12, wherein the first angle and second angle are substantially equal.

15. The apparatus of claim 12, wherein the third angle and the fourth angle are substantially equal.

16. The apparatus of claim 12, wherein the first angle, the second angle, the third angle, and the fourth angle are substantially equal.

17. The apparatus of claim 12, further comprising a power circuit configured to provide a time-varying current to the coil structure.

18. The apparatus of claim 17, further comprising a battery configured to provide a direct current to the power circuit.

19. The apparatus of claim 12, further comprising a receive circuit configured to receive a time-varying current from the coil structure, the time-varying current induced in the coil structure by a magnetic field.

20. The apparatus of claim 19, wherein the receive circuit is configured to generate a voltage to charge a battery.

21. The apparatus of claim 12, wherein the center portion of the first coil and the center portion of the second coil each has a dimension in the range of approximately 0.3 to 1.5 inches.

22. The apparatus of claim 12, wherein the first side portion and the second side portion of each coil face each other.

* * * * *